Dec. 26, 1944. M. C. FRIDOLPH Re. 22,583

PANTIE CONSTRUCTION

Original Filed Feb. 28, 1938 2 Sheets-Sheet 1

Inventor

Maude C. Fridolph

By Lyon & Lyon

Attorneys

Dec. 26, 1944. M. C. FRIDOLPH Re. 22,583

PANTIE CONSTRUCTION

Original Filed Feb. 28, 1938 2 Sheets-Sheet 2

Inventor

Maude C. Fridolph

By Lyon & Lyon

Attorneys

Reissued Dec. 26, 1944

Re. 22,583

UNITED STATES PATENT OFFICE 22,583

PANTIE CONSTRUCTION

Maude C. Fridolph, New York, N. Y.

Original No. 2,205,745, dated June 25, 1940, Serial No. 192,925, February 28, 1938. Renewed November 20, 1939. Application for reissue December 15, 1941, Serial No. 423,085

5 Claims. (Cl. 2—224)

This invention relates to the construction of garments adapted to encircle the torso including the hips and upper portion of the thigh and extending upwardly to at least the region of the waist. Garments of this sort are generally known in the trade as step-in girdles or corselettes and the same construction may be utilized in swim trunks and other abbreviated garments. In some forms the garment may be provided with an upper portion adapted to cover the bust.

Garments of this nature are to be distinguished from corsets which are generally open at the bottom and not provided with separate leg openings. Furthermore, corsets are generally reinforced to a very material extent and restrain the body whereas an object of the present garment is to give absolute freedom without restraint and at the same time suitably mold the figure. The garments also are to be distinguished from trunks such as are shown in Patent No. 2,012,879 or Patent No. 1,929,363, in that trunks of the character shown in these patents are not provided with separate legs or portions adapted to lay flat against the inner opposing surfaces of the legs. In the very brief trunks of the type shown in the prior patents mentioned there is a tendency for the edge of the material passing through the crotch to chafe the inner opposing surfaces of the legs whereas such chafing is completely obviated by the construction of this invention. Furthermore, prior garments are not satisfactory in that they ride up in the back and over the buttocks, this resulting in material discomfort and further crotch cutting. Attempts have been made to obviate this by the use of resiliently stretchable materials, whereas the present invention prevents crotch cutting without the necessity of employing resiliently stretchable materials.

Generally stated, the present invention relates to a form of construction whereby a single continuous strip of material extends through the crotch and preferably over the abdomen in front and partly up the back of the wearer. This continuous strip is of variable width and when used in combination with the side portions of the garment, such side portions cooperate with the continuous longitudinal strip in such manner as to positively and effectively cause said crotch portion to be pulled downwardly away from the crotch, thereby preventing the crotch portion of the garment from actually pressing against, chafing and cutting into the crotch of the wearer.

It is an object of this invention, therefore, to disclose a form of construction adapted for use in garments encircling the torso of the wearer whereby the elements of the garment cooperate to suitably mold the figure without chafing, cutting, or other discomfort.

Another object of the invention is to disclose and provide a garment construction embodying a substantially continuous crotch member extending upwardly over the abdomen and through the crotch to the back of the wearer, said continuous member cooperating with horizontally yieldingly stretchable side portions to cause said continuous crotch member to be pulled downwardly away from the crotch of the wearer, when in use.

A still further object of the invention is to disclose and provide a construction for a body garment whereby the garment is prevented from crawling or shifting while on the body.

An object of the invention is to provide a construction for a body garment whereby the rear of the garment is anchored beneath the bulge of the buttocks without unduly constricting the legs of the wearer.

These and other objects, uses, advantages and adaptations of the invention will be apparent to those skilled in the art from the following detailed description. For purposes of explanation, reference will be had to the appended drawings illustrating forms of the invention.

Figure 4:
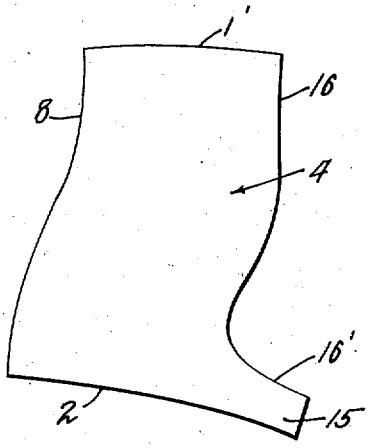
Figure 3:
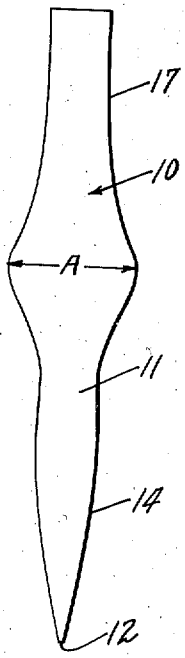
Figure 5:
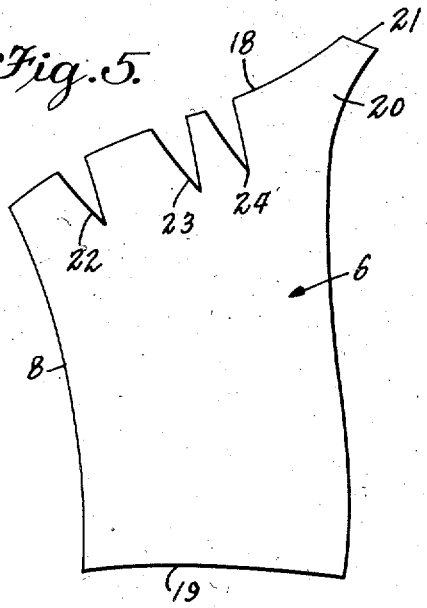

Figs. 3, 4 and 5 diagrammatically and approximately show the general contour of elements in extended form, from which the garment may be constructed.

Figure 6:
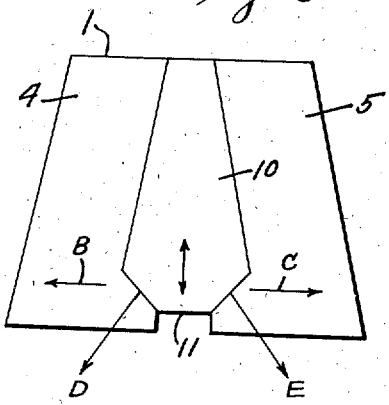

Fig. 6 diagrammatically illustrates the approximate translation of forces which takes place when the garment is on the body of the wearer.

In the illustrative form of garment shown in the drawings the garment extends from a waist margin 1 downwardly to a zone below a horizontal plane passing through the crotch of the wearer. The garment is provided with two leg openings, the lower edges of such leg openings being indicated at 2 and 3. The sides of the garment may be made from one, two or more pieces of material.

As shown, the garment comprises two side front members 4 and 5 and two side rear members 6 and 7. The members 4 and 6 may be connected along a side seam, indicated at 8. The members 4 to 7 may be made of any desired fabric or material and need not be resiliently stretchable although the so-called "lastex" thread fabrics can be used if desired. If a resiliently stretchable fabric is employed, then it should be stretchable in a horizontal direction. It is to be understood, however, that material stretchable in both directions may be used, and, in the subsequent description stretchable materials will be referred to. The particular construction of this invention, however, permits the production of an effective garment without the necessity of employing the more expensive and heavier stretchable materials. Knit goods can be used to advantage, particularly if the garment is designed for use as a sun suit, swim suit, or the like.

In addition, the garment includes a continuous member 10. This member may extend from the region of the waist downwardly over the abdomen and preferably then pass between the legs of the wearer, the rearward extension of said member extending upwardly at the back of the wearer. Such rearward extension may extend upwardly at the back of the wearer for but a short distance or it may, if desired, extend upwardly at the back of the wearer to the region of the waist. As shown in the drawings, such rearward extension extends upwardly at the back only a part of the distance to the waist. The desired absence of chafing in the crotch could be obtained even though the member 10 did not extend all the way through the crotch. It is sufficient if the member 10 extends through zone A hereinafter referred to. In the preferred form, however, the member 10 does pass between the legs and part way up the back of the wearer.

Figure 1:
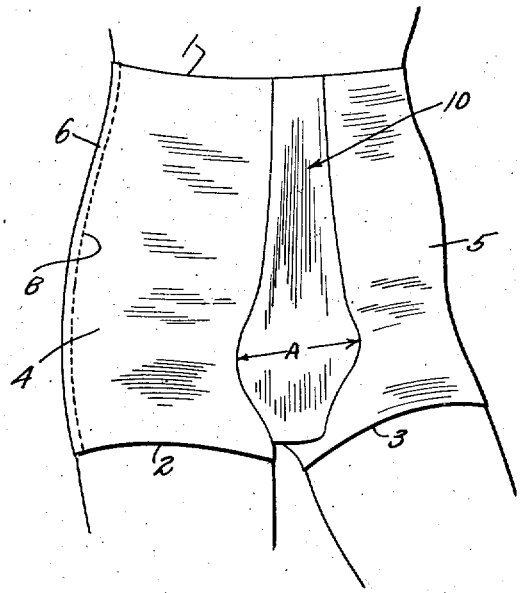
Fig. 1 is a three-quarter front view of one form of pantie constructed in accordance with the invention.
Figure 2:
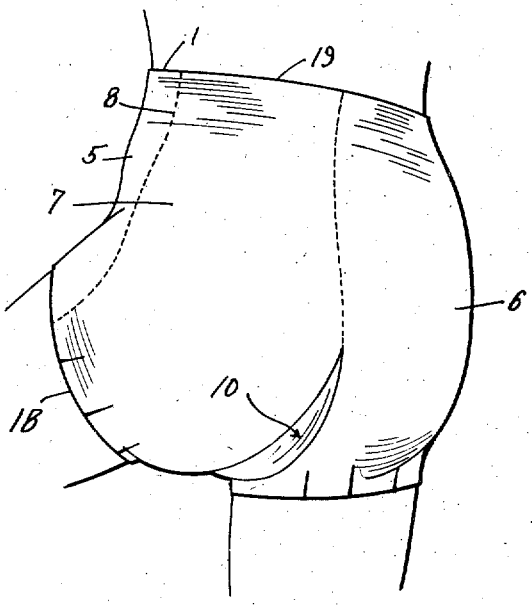
Fig. 2 is a three-quarter rear view of the garment.

The material from which member 10 is made is preferably stretchable longitudinally of said member 10, i. e., in a vertical direction over the abdomen and in a substantially horizontal direction through the crotch. The important factor is that the member 10 is not stretchable in a transverse direction. The member 10 is preferably, but not necessarily, stretchable longitudinally. It can not, however, be stretched transversely. The member 10 is preferably of varying width along its length. It is essential, however, that this member 10 be relatively wide at a zone traversing the upper part of the pubic region and above a horizontal plane passing through the crotch. Such relatively wide zone is indicated in Fig. 1 at A. From this zone downwardly the member should become narrower so that that portion of the member 10 which extends through the crotch is only sufficient to comfortably cover the crotch and bridge the distance between the opposing inner surfaces of the legs through the crotch. The rearward extension of the member 10 may be provided with another enlargement adapted to be positioned above the level of the crotch or it may gradually narrow in width towards its rear terminal.

By referring to Figs. 3, 4 and 5, the elements embodying one form of this invention may be understood. As shown in Fig. 3, the continuous member 10 may be of substantially uniform or gradually increasing width from its upper end (ordinarily passing through or terminating in the region of the waist) to a maximum width at the zone A hereinafter referred to. Thereafter the member 10 narrows into the crotch portion indicated at 11 and then extends to its rear terminal 12 along the lines 14. The rear terminal 12 preferably terminates at about the base of the spine and below a plane passing through the hip and does not extend upwardly to the waist. The front side member 4 is indicated in Fig. 4 and it is to be noted that this side member 4 is provided with a lower edge 2 adapted to form the lower edge of the leg openings. Such lower edge 2 is materially longer than the upper edge 1' adapted to form the waist margin. The lower edge 2 is a part of an inwardly directed extension 15 which is relatively narrow and which is a continuation of the front center edge 16 which is adapted to be attached to the edge 17 of the member 10. The edge 16 is provided with an indentation adapted to accommodate the zone of increased width A existing in the member 10. The extension 15 is adapted to cover the inner surface of the leg of the wearer and the edge portion 16' is to be attached to the forward section of the crotch portion 11 of the member 10.

The rear side member 6 is shown in inverted position in Fig. 5 and its lower edge 18 is longer than the upper rear waist margin edge 19. Furthermore, the lower portion of the member 6 is provided with an inwardly and downwardly directed extension 20, the end of such extension 21 being adapted to be attached to the end of the extension 15 of the front member 4, such extension also lying against the inner surface of the leg of the wearer.

Means are provided for preventing the rear portions of the garment from crawling upwardly over the buttocks. This crawling tendency is very objectionable and tends to take place whenever the wearer of a garment is engaged in sports or as a result of repeated changes in posture. In accordance with my invention, the lower edges 18 of the rear portion 6 of the garment is gathered as by means of the darts 22, 23, 24 and the like, thereby assuring sufficient fullness in the region of the buttock and cupping the rear portion 6 around the buttock, causing the lower edge 18 to thereby retain its proper position beneath the buttock without discomfort and without permitting large muscles of the buttocks to slip down from beneath such edge 18.

When the garment is on the body the side portions 4 and 5 exert a pull in the general direction of the arrows B and C. The strip member 10 is inelastic in a horizontal direction and the widest portion of zone A is fixed in location by the tension applied by the side portions. Movement of the garment during change of posture of the wearer occurs about a line through the widest portion of zone A rather than about the crotch. The leg encircling portions of the garment assist in preventing cutting of the crotch by applying downward components of force on the strip 10. The shifting, binding or cutting of the garment into the crotch of the wearer is thus prevented and the resulting downward components of force take the general direction of the arrows D and E.

What I claim is:

1. In a garment, the combination of side panels and a front portion, said front portion having divergingly directed edges extending upwardly from the crotch to a pair of points adapted to be located when on the wearer adjacent outer sides of the upper pubic region, the edges of said portion above said pair of points being at acute angles to the edges extending from the crotch to said points, said side panels being attached to said edges, said front portion between said points being substantially inelastic in a horizontal direction and said side panels applying a horizontal tension to said front portion at said points whereby a horizontal line through said points operates as the fulcrum about which movement of the garment occurs during body movement by the wearer and leg encircling portions connected to and extending downwardly from said side panels and below the crotch to apply a downward force on said front portion adjacent the crotch, said downward force applied by the encircling leg portions cooperating with the horizontal force applied by the side panels at said fulcrum points to prevent upward movement and cutting of the garment into the crotch of the wearer.

2. In a garment, the combination of side panels and a front portion, said side panels being resilient in a horizontal direction, said front portion extending through the crotch and having divergingly directed edges extending upwardly from the crotch to a pair of points adapted to be located when on the wearer adjacent opposite outer sides of the upper pubic region and inwardly directed edges above said points, said side panels being attached to said edges, said front portion between said points being substantially inelastic in a horizontal direction, said resilient side panels applying a horizontal tension to said front portion at said points whereby said points operate as fulcrum points, and leg encircling portions attached to said side panels and extending beneath said crotch whereby said leg encircling portions exert a downward force on said front portion from said fulcrum points to said crotch, said downward force exerted by the leg portions cooperating with the fulcrum points created by the horizontal tension applied to the front portion by the side panels whereby that portion of the strip extending downwardly from the fulcrum points to the crotch is prevented from cutting upward into the crotch of the wearer.

3. In a garment, the combination of a strip unit and a body member shaped to encircle the body throughout an area at least as long as the buttocks, the lower rear portion of said body member being preformed to follow the contour of the lower portion of the buttocks of the wearer to prevent said garment from crawling up over the buttocks, said strip unit being substantially inelastic in a horizontal direction, said strip differing in width and extending downwardly over the abdomen and rearwardly toward the crotch, said strip being attached throughout its length at its side edges to said body member and provided with upwardly and divergingly directed edges between the crotch portion and that portion traversing the abdomen and with the opposite edges adjacent the lower abdominal portion extending at angles to said divergingly directed edges, said body portion having separate leg encircling portions for exerting a downward thrust on said strip adjacent the crotch portion thereof and said downwardly extending forces created by the leg portions cooperating with the divergingly directed edges to prevent upward cutting of the crotch of the wearer.

4. In a garment, the combination of a crotch strip and a body portion shaped to encircle the body throughout an area not less than the length of the buttocks, said crotch strip being substantially inelastic in a horizontal direction, said strip varying in width and having its widest portion over the upper part of the pubic region, said strip being attached throughout its length at its side edges to said body portion, said body portion cooperating with the edges of said widened portion of the strip to established fulcrum points at the extreme edges of said widened portion, and leg encircling members attached to and extending downwardly from said body portion and attached to said crotch strip beneath said edges of the widened portion, said leg encircling portions exerting a downward force on said crotch strip and cooperating with the fulcrum points whereby the entire portion of said crotch strip beneath said fulcrum points is stretched downwardly and outwardly to prevent upward cutting of the crotch of the wearer.

5. In a garment, the combination of a strip unit and a body portion shaped to encircle the body throughout an area at least as long as the buttocks, said body portion extending below the level of the crotch and having separate leg encircling portions, the rear of said body portion being preformed to form cups for the buttocks of the wearer, said strip unit being located in the lower front portion of the garment extending toward the crotch and having a widened portion over the upper part of the pubic region, the widest portion of said strip terminating at points adapted to be located when on the wearer adjacent the opposite outer sides of the upper pubic region, said strip unit being substantially inelastic in a horizontal direction and being attached at its side edges to said body portion at the opposite edges of said widened portion and to said leg portions, the body portion adjacent said opposite edges exerting opposite horizontal forces at said edges and said leg portions exerting downward forces on said strip below said widened portion whereby said horizontal forces and downward forces cooperate on said strip to prevent upward cutting of the crotch of the wearer, the preformed cups in the rear of the garment preventing said garment from crawling up over the buttocks.

MAUDE C. FRIDOLPH.